(12) United States Patent
Avedisov et al.

(10) Patent No.: US 11,904,855 B2
(45) Date of Patent: Feb. 20, 2024

(54) COOPERATIVE DRIVING SYSTEM AND METHOD

(71) Applicant: Toyota Motor Engineering & Manufacturing North America, Inc., Plano, TX (US)

(72) Inventors: Sergei S. Avedisov, Cupertino, CA (US); Ziran Wang, San Jose, CA (US); Ahmed H. Sakr, Mountain View, CA (US); Kyungtae Han, Palo Alto, CA (US); Rui Guo, San Jose, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 155 days.

(21) Appl. No.: 17/174,998

(22) Filed: Feb. 12, 2021

(65) Prior Publication Data

US 2022/0258732 A1 Aug. 18, 2022

(51) Int. Cl.
*B60W 30/095* (2012.01)
*B60W 60/00* (2020.01)
(Continued)

(52) U.S. Cl.
CPC ...... *B60W 30/0956* (2013.01); *B60W 40/105* (2013.01); *B60W 40/107* (2013.01); *B60W 60/0016* (2020.02); *B60W 2556/65* (2020.02)

(58) Field of Classification Search
CPC ......... B60W 30/0956; B60W 60/0016; B60W 40/105; B60W 40/107; B60W 2556/65
See application file for complete search history.

(56) References Cited

U.S. PATENT DOCUMENTS 10,089,876 B1 * 10/2018 Ramasamy ............ G05D 1/028
10,386,192 B1    8/2019 Konrardy et al.
(Continued)

FOREIGN PATENT DOCUMENTS

DE    102016205972 A1    11/2017

OTHER PUBLICATIONS

Lehmann et al., "A Generic Approach towards Maneuver Coordination for Automated Vehicles," Proc. IEEE 21st International Conference on Intelligent Transportation Systems (ITSC), pp. 3333-3339, Maui, Hawaii, USA, Nov. 4-7, 2018 (Abstract).

(Continued)

*Primary Examiner* — Fadey S. Jabr
*Assistant Examiner* — Naeem Taslim Alam
(74) *Attorney, Agent, or Firm* — Christopher G. Darrow; Darrow Mustafa PC

(57) ABSTRACT

A cooperative driving system includes a processor and a memory having one or more modules. The modules cause the processor to determine a route that includes a road segment to a destination for an ego vehicle based on (1) an ego vehicle operating parameter that has information regarding a preferred operation of an ego vehicle by an occupant, and (2) a location of a like vehicle with respect to the ego vehicle when the ego vehicle is traveling on at least a portion of the route. The one or more modules also cause the processor to determine a road-segment-level decision for the ego vehicle for the road segment based on the ego vehicle operating parameter, communicate with the like vehicle near the road segment to negotiate the road-segment-level decision to generate a negotiated road-segment-level decision, and maneuver the ego vehicle inside the road segment using the negotiated road-segment-level decision.

20 Claims, 8 Drawing Sheets

(51) Int. Cl.
    *B60W 40/107*     (2012.01)
    *B60W 40/105*     (2012.01)

(56) References Cited

U.S. PATENT DOCUMENTS

| | | | |
|---|---|---|---|
| 11,242,051 B1* | 2/2022 | Konrardy | G08G 1/096791 |
| 2014/0358420 A1* | 12/2014 | Noh | G01C 21/3658 |
| | | | 701/409 |
| 2016/0167652 A1* | 6/2016 | Slusar | G01C 21/3461 |
| | | | 701/27 |
| 2017/0015318 A1 | 1/2017 | Scofield et al. | |
| 2017/0291608 A1 | 10/2017 | Engel et al. | |
| 2017/0297586 A1* | 10/2017 | Li | B60W 50/0098 |
| 2017/0305419 A1* | 10/2017 | Liebinger Portela | B60T 7/12 |
| 2018/0022350 A1* | 1/2018 | McNew | B60W 40/09 |
| | | | 701/23 |
| 2018/0039917 A1* | 2/2018 | Buttolo | B60W 60/00253 |
| 2018/0115898 A1* | 4/2018 | Han | G08G 1/161 |
| 2018/0132193 A1* | 5/2018 | Misener | H04W 52/383 |
| 2018/0141568 A1* | 5/2018 | Singhal | G08G 1/161 |
| 2018/0158337 A1* | 6/2018 | Koravadi | B60W 30/0953 |
| 2018/0170392 A1 | 6/2018 | Yang et al. | |
| 2018/0225975 A1* | 8/2018 | Park | G05D 1/0295 |
| 2018/0266834 A1* | 9/2018 | Cronin | G01C 21/3664 |
| 2019/0001987 A1* | 1/2019 | Kim | B60W 60/00136 |
| 2019/0051179 A1* | 2/2019 | Alvarez | H04W 4/46 |
| 2019/0077402 A1* | 3/2019 | Kim | B60W 30/12 |
| 2019/0286133 A1 | 9/2019 | Bielby | |
| 2020/0271469 A1* | 8/2020 | Willis | G07C 5/0808 |
| 2021/0056443 A1* | 2/2021 | Bradley | G07C 5/0816 |
| 2021/0179125 A1* | 6/2021 | Vardharajan | G05D 1/0221 |
| 2021/0278840 A1* | 9/2021 | Jaegal | G05D 1/0088 |
| 2022/0194425 A1* | 6/2022 | Pöllny | B60W 30/14 |
| 2022/0206166 A1* | 6/2022 | Bae | G01S 19/42 |

OTHER PUBLICATIONS

Cao et al., "A 5G V2X testbed for cooperative automated driving," 2016 IEEE Vehicular Networking Conference (VNC), 2016 (Abstract).
Ghafoor et al., "Enabling Efficient Coexistence of DSRC and C-V2X in Vehicular Networks," IEEE Wireless Communications, 27(2), 9 pages (2019).
Nichting et al., "Explicit Negotiation Method for Cooperative Automated Vehicles," 2019 IEEE International Conference on Vehicular Electronics and Safety (ICVES), 2019 (Abstract).
Wang et al., "Developing a distributed consensus-based cooperative adaptive cruise control system for heterogeneous vehicles with predecessor following topology," Journal of Advanced Transportation, vol. 2017, Article D 1023654, 17 pages.
Unknown, "Taxonomy and Definitions for Terms Related to Cooperative Driving Automation for On-Road Motor Vehicles J3216_202005," https://www.sae.org/standards/content/j3216_202005/ (last accessed Feb. 12, 2021).
Correa, "Transition Areas for Infrastructure-Assisted Driving," ART-05-2016—GA Nr 723390, TransAID, 79 pages (2019).

* cited by examiner

COOPERATIVE DRIVING SYSTEM AND METHOD

TECHNICAL FIELD

The subject matter described herein relates, in general, to systems and methods for cooperative driving of vehicles.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles can communicate with each other and with other parties. This type of communication is sometimes referred to as vehicle-to-vehicle ("V2V"), vehicle-to-infrastructure ("V2I"), and vehicle-to-everything ("V2X") communication. As such, vehicles can share information, distribute processing tasks, and the like using short-range wireless signals. In some cases, the ability of vehicles to communicate with each other allows vehicles to maneuver safely with respect to one another.

SUMMARY

This section generally summarizes the disclosure and is not a comprehensive explanation of its full scope or all its features.

In one embodiment, a user-customized cooperative driving system includes a processor and a memory having one or more modules. The modules cause the processor to determine a route that includes a road segment to a destination for an ego vehicle based on (1) an ego vehicle operating parameter that has information regarding a preferred operation of an ego vehicle by an occupant, and (2) a location of a like vehicle with respect to the ego vehicle when the ego vehicle is traveling on at least a portion of the route. The ego vehicle operating parameter includes information regarding a preferred operation of an ego vehicle by an occupant. The like vehicle may have a like vehicle operating parameter similar to the ego vehicle operating parameter.

The one or more modules also cause the processor to determine a road-segment-level decision for the ego vehicle for the road segment based on the ego vehicle operating parameter, communicate with the like vehicle near the road segment to negotiate the road-segment-level decision to generate a negotiated road-segment-level decision, and maneuver the ego vehicle inside the road segment using the negotiated road-segment-level decision. The road-segment-level decision includes a specific trajectory for the ego vehicle to occupy the road segment of the route.

In another embodiment, a method for cooperative driving includes the steps of determining a route including a road segment to a destination for an ego vehicle based on (1) an ego vehicle operating parameter and (2) a location of a like vehicle with respect to the ego vehicle when the ego vehicle is traveling on at least a portion of the route, determining a road-segment-level decision for the ego vehicle for the road segment based on the ego vehicle operating parameter, communicating with the like vehicle near the road segment to negotiate the road-segment-level decision to generate a negotiated road-segment-level decision, and maneuvering the ego vehicle inside the road segment using the negotiated road-segment-level decision Like before, the ego vehicle operating parameter includes information regarding a preferred operation of an ego vehicle by an occupant and the like vehicle may have a like vehicle operating parameter similar to the ego vehicle operating parameter.

In yet another embodiment, a non-transitory computer-readable medium including instructions that, when executed a processor, causes the processor to determine a route including a road segment to a destination for an ego vehicle based on (1) an ego vehicle operating parameter, and (2) a location of a like vehicle with respect to the ego vehicle when the ego vehicle is traveling on at least a portion of the route, determine a road-segment-level decision for the ego vehicle for the road segment based on the ego vehicle operating parameter, communicate with the like vehicle near the road segment to negotiate the road-segment-level decision to generate a negotiated road-segment-level decision, and maneuver the ego vehicle inside the road segment using the negotiated road-segment-level decision. Again, the ego vehicle operating parameter includes information regarding a preferred operation of an ego vehicle by an occupant, and the like vehicle may have a like vehicle operating parameter that is similar to the ego vehicle operating parameter.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a cooperative driving system and method. Cooperative driving, including cooperative automated driving, requires a decision and control framework that is tailored to the performance and comfort preferences of the occupants of the vehicle while guaranteeing the safety of these occupants. The cooperative driving system may include two primary components.

The first primary component relates to a long-time scale framework. In one example, the long-time scale framework utilizes information stored on a cloud-based server that may be communicated with from the vehicle having the cooperative driving system by a cellular connection. The cooperative driving system may receive information from this cloud-based server using a digital twin framework to adjust the decisions and controls to suit the drivers' and/or occupants' preferences based on data collected and stored within the cloud-based server. As such, the long-time scale framework can make network-level decisions, such as destination selection, route selection, rest stop selection, and provide personalized directions based on the previous performance of an operator and or otherwise selected.

The second component of the cooperative driving system operates on a short-timescale framework. In one example, a vehicle that has the cooperative driving system may communicate with other vehicles via a V2X communication protocol to make road-segment-level decisions, such as merging order, intersection passing order, whether to execute a turn, etc. and provide specific directions to a human operator or vehicle controllers of the vehicle to perform the prescribed maneuver with a specific trajectory.

Figure 1:
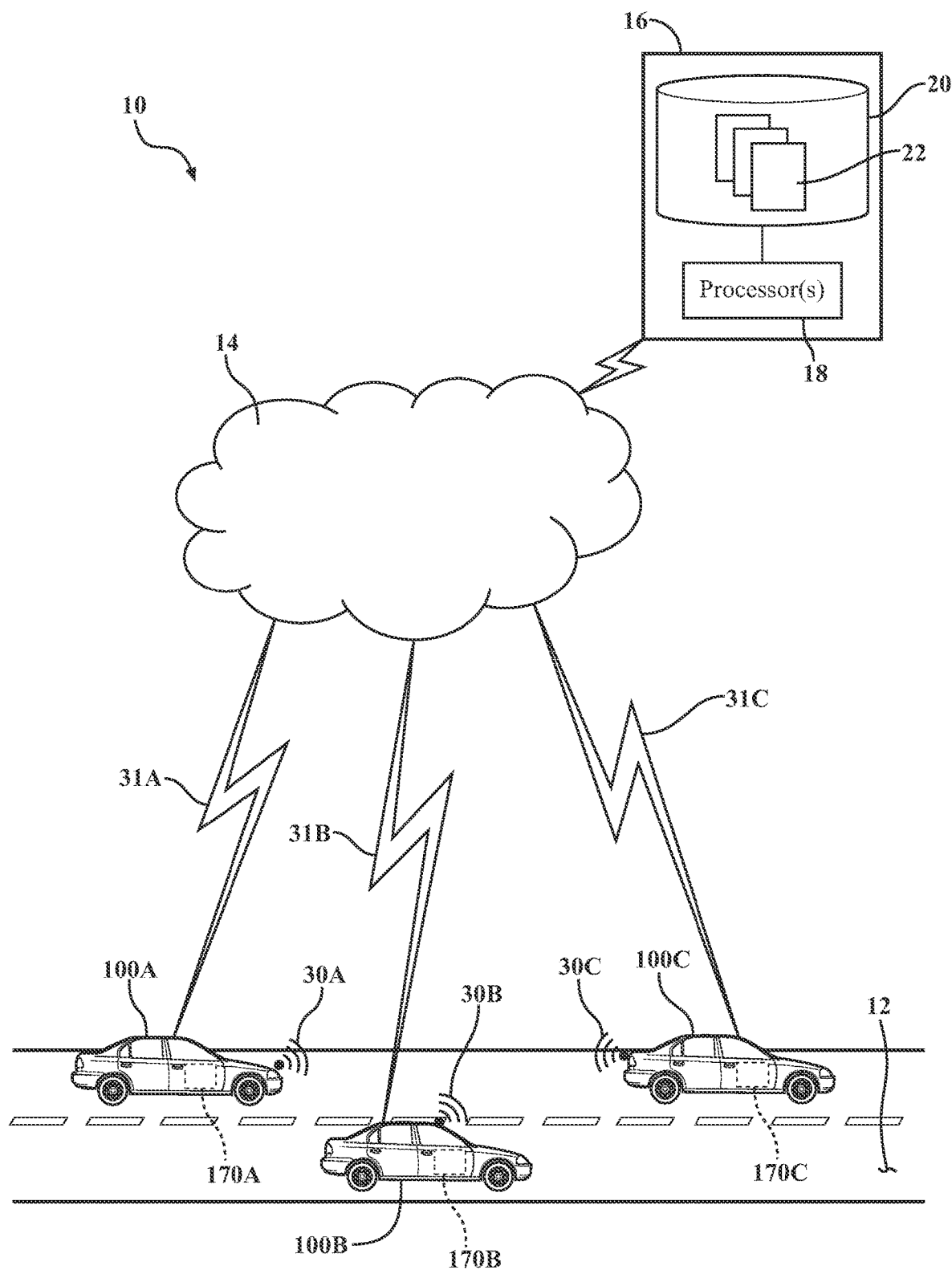
FIG. 1 illustrates an example of multiple vehicles that utilize a cooperative driving system operating in an environment.

As such, referring to FIG. 1, an example of an environment 10 that includes a road 12 is shown. Traveling along the road 12 are vehicles 100A-100C, each of which has a cooperative driving system 170A-170C, respectively. It should be understood that the environment 10 is just but one environment in which one or more vehicles 100A-100C having the cooperative driving systems 170A-170C may be utilized. As stated before, the long-time scale framework may rely on the ability to communicate with a cloud-based server 16 that includes one or more processors 18 that may be in communication with a storage device 20. The storage device 20 may store information 22 related to long-time scale decisions, such as network-level decisions and one or more parameters.

The cooperative driving systems 170A-170C may communicate with the cloud-based server 16 via network 14 using one or more communication links 31A-31C. In one example, the one or more communication links 31A-31C may be cellular communication links. The network 14 may be a distributed network, such as the Internet. As such, the cooperative driving systems 170A-170C can upload data to the cloud-based server 16 regarding a route to be taken, possible maneuvers along the route, and driver preferences from past trips. The cooperative driving systems 170A-170C can also receive information from the cloud-based server 16 that may include a tailored set of one or more parameters to engage in a negotiation for the duration of a trip or part of a trip the vehicles 100A-100C are undertaking. Details regarding this will be described later in this specification.

As stated above, the cooperative driving systems 170A-170C also operate on a short-time scale framework. Essentially, the vehicles 100A-100C, using their cooperative driving systems 170A-170C, can communicate with each other to negotiate and perform maneuvers between themselves and/or other vehicles/objects. The cooperative driving systems 170A-170C may have communication links 30A-30C between each other respectively, that may be short-range communication links, such as dedicated short-range communication ("DSRC"). However, it should be understood that any type of suitable communication methodology can be utilized.

Figure 2:
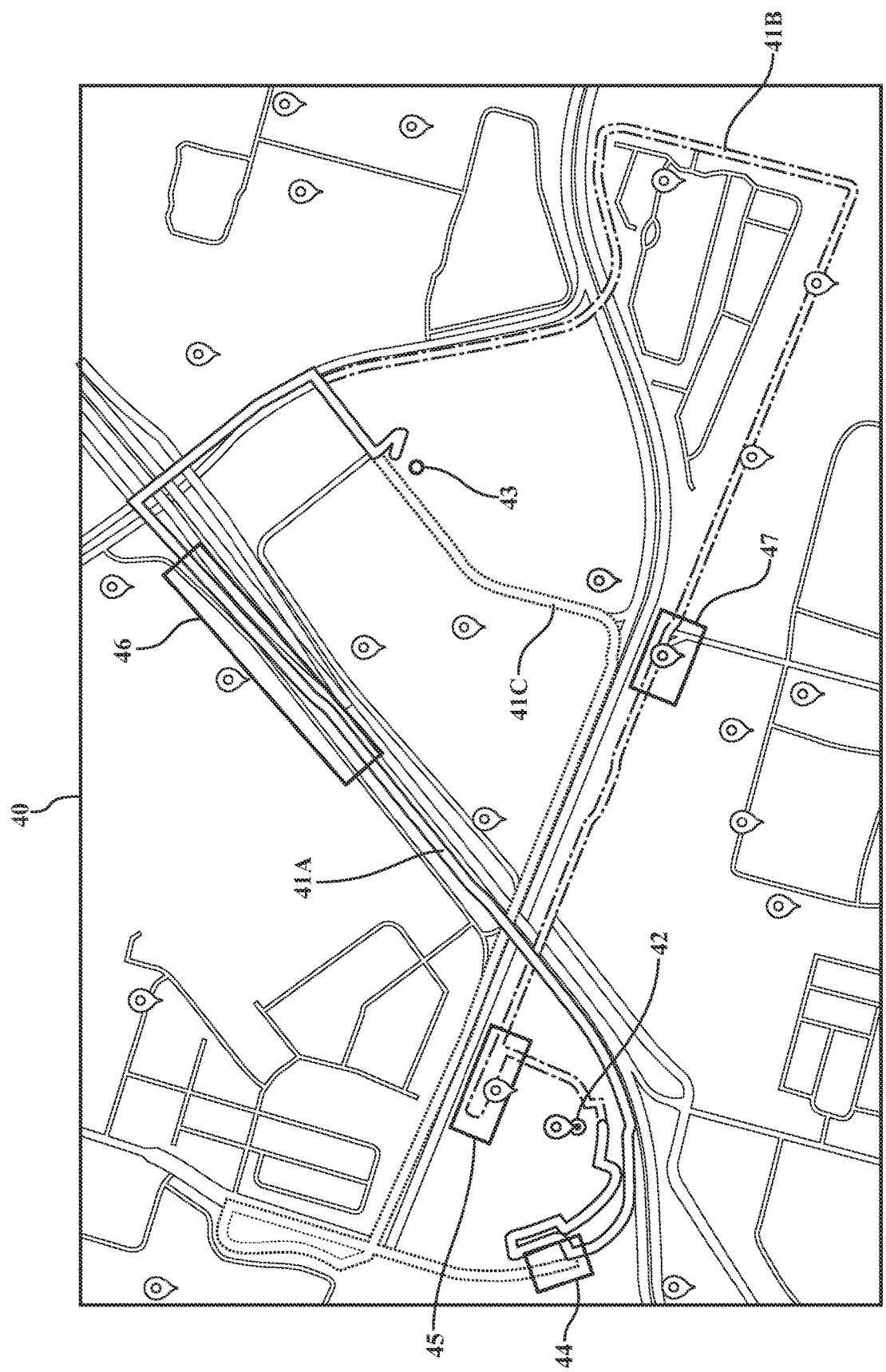
FIG. 2 illustrates an example of a map that illustrates routes utilized by a cooperative driving system when making a network level decision on a long-time scale.

To provide some additional context regarding a network level decision on a long-time scale, reference is made to FIG. 2. FIG. 2 illustrates a map 40 that illustrates three different routes 41A-41C between an origin 42 and a destination 43. A vehicle could take anyone of these three routes 41A-41C to travel from the origin 42 to the destination 43. However, each of these three routes 41A-41C have different attributes that may relate to the amount of risk, distance, time, useful stops along the way, etc.

For example, the route 41A has an unprotected left turn 44 but is generally viewed as the least risky route. In this example, the route 41A is 1.8 miles long and has an estimated six-minute completion time. The route 41B is classified as a medium risk route, as it has an unprotected U-turn 45. The route 41B is 2 miles long has an estimated six-minute completion time but has a gas station 47 located along the route 41B, which may be useful to the operator of a vehicle taking the route if the vehicle is low on fuel. Finally, the route 41C has a highway ramp merge 46 and is generally considered the riskiest route. This route is 1.5 miles long and has an estimated completion time of five minutes. A summary of the routes 41A-41C is shown in the table below.

| Route | Risk Level | Distance | Duration | Other |
| --- | --- | --- | --- | --- |
| 41A | Low | 1.8 | 6 | |
| 41B | Medium | 2 | 6 | Gas Station |
| 41C | High | 1.5 | 5 | |

As such, each of the routes above have different advantages. For example, the route 41C is the quickest route with the shortest distance but has the greatest risk. The route 41A has the lowest risk but has a longer distance and duration than the route 41C. The route 41B has a medium amount of risk but has the advantage of a gas station along the way, which may be useful to the vehicle's operator.

Here, the cooperative driving systems 170A-170C can communicate, using a cellular connection or any suitable connection, with the cloud-based server 16 to determine if the cloud contains the information 22 related to the operator's preferences, which may be referred to as one or more parameter(s). In one example, the information 22 may be a digital twin that essentially mimics the operator's actions and decisions. Using this digital twin, the cooperative driving systems 170A-170C can determine what type of route the operator would normally select. If the operator's preference is to take the fastest route in every case, the route 41C will be selected. If the operator's preference is to take the safest route, the route 41A will be selected. If the digital twin on the cloud-based server 16 has learned that the operator will be taking a long trip tomorrow, the route 41B will be selected, as there is a gas station located along the route allowing the operator to refuel their vehicle for their long trip.

Figure 3A:
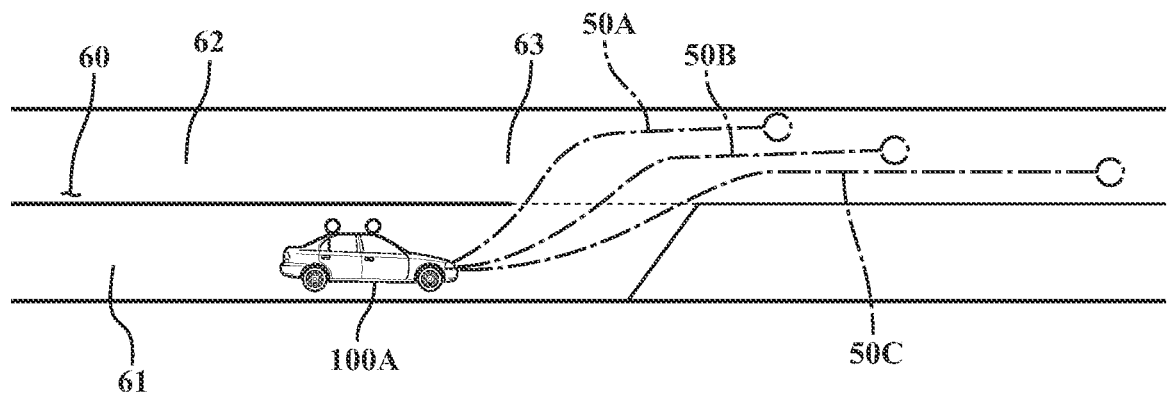
FIGS. 3A-3C illustrate an example of a road-segment-level decision being performed by a vehicle that utilizes a cooperative driving system.
Figure 3B:
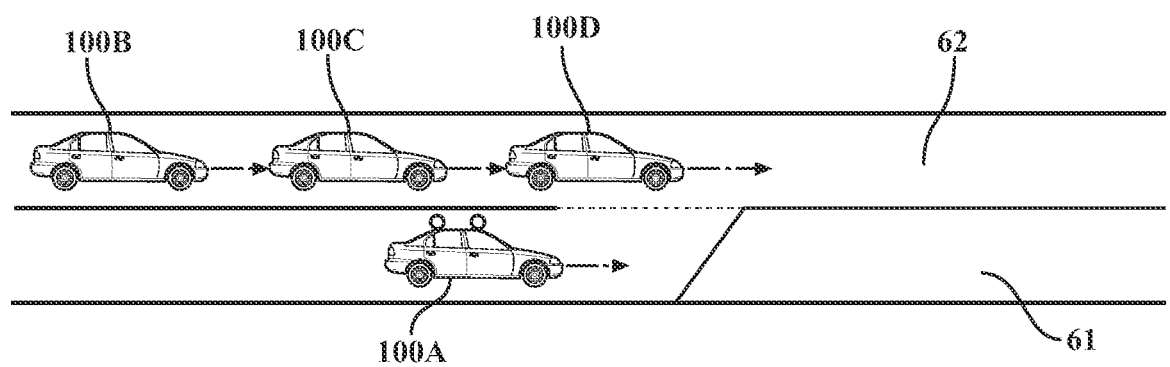
Figure 3C:
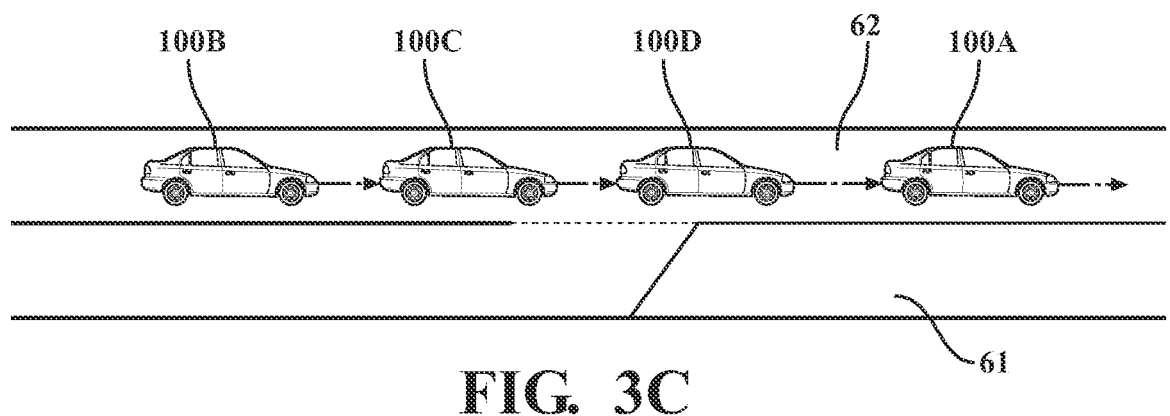

In order to provide some additional context regarding a road-segment-level decision on a short-time scale, reference is made to FIGS. 3A-3C. Moreover, regarding FIG. 3A, this figure illustrates a vehicle 100A traveling along a road 60 that includes lanes 61 and 62. Here, assume that the vehicle 100A wishes to merge into a lane 62 from a lane 61. Illustrated are three distinct specific trajectories 50A-50C that the vehicle 100A can take to merge. These distinct specific trajectories 50A-50C may include the position, velocity, and acceleration profile of the vehicle 100A for a given period of time.

A road-segment-level decision is a set of specific trajectories that share a common trait, such as occupying a specific road segment or road segments. As such, referring to FIG. 3A in all of the trajectories 50A-50C, the vehicle 100A moves into given road segment 63 of the left lane 62. As such, the trajectories 50A-50C all belong to the category of merging into a left lane decision.

FIG. 3B illustrates a road-segment-level decision. Moreover, FIG. 3B illustrates the vehicle 100A attempting to merge into the lane 62 that includes vehicles 100B-100D. Here, many different trajectories can be used to merge the vehicle 100A either ahead of the vehicle 100D or between or behind the vehicles 100B-100D. FIG. 3C illustrates that the vehicle 100a has accelerated and decided to merge ahead of the vehicles 100B-100D.

Figure 4A:
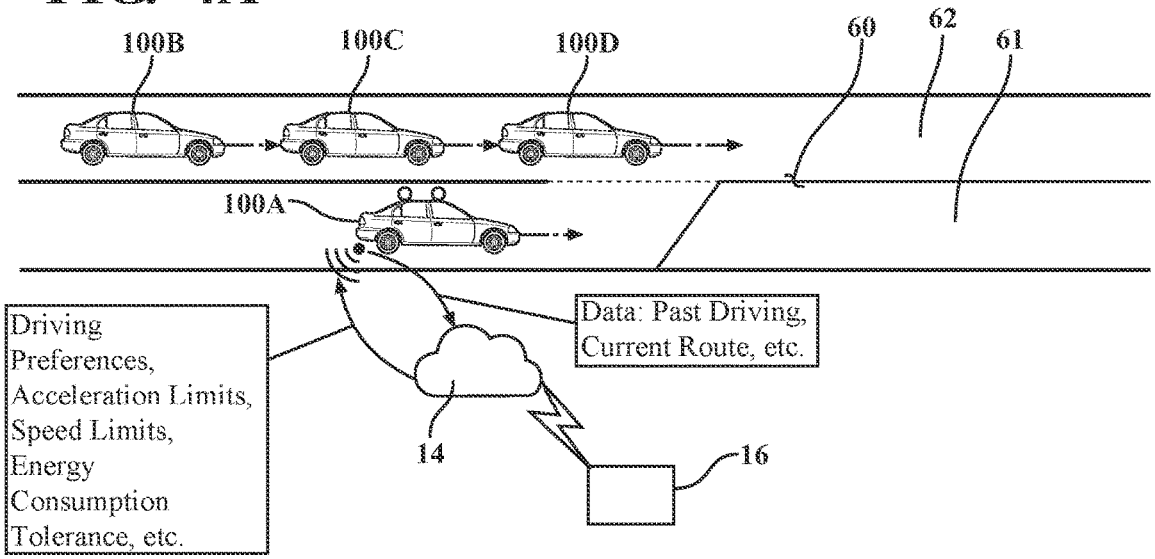
FIGS. 4A-4D illustrate an example of a cooperative merge being performed by a cooperative driving system.
Figure 4B:
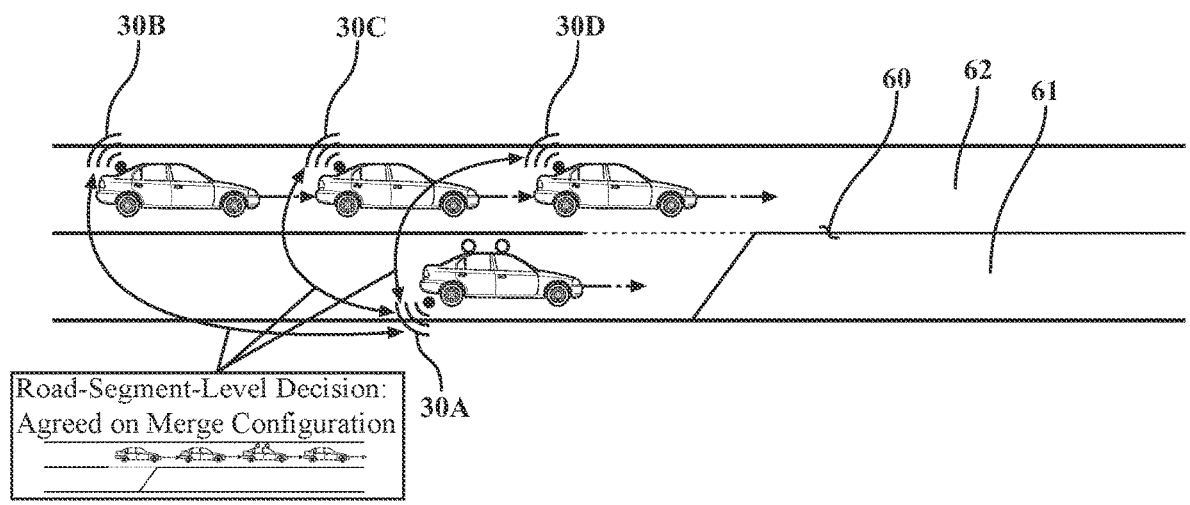
Figure 4C:
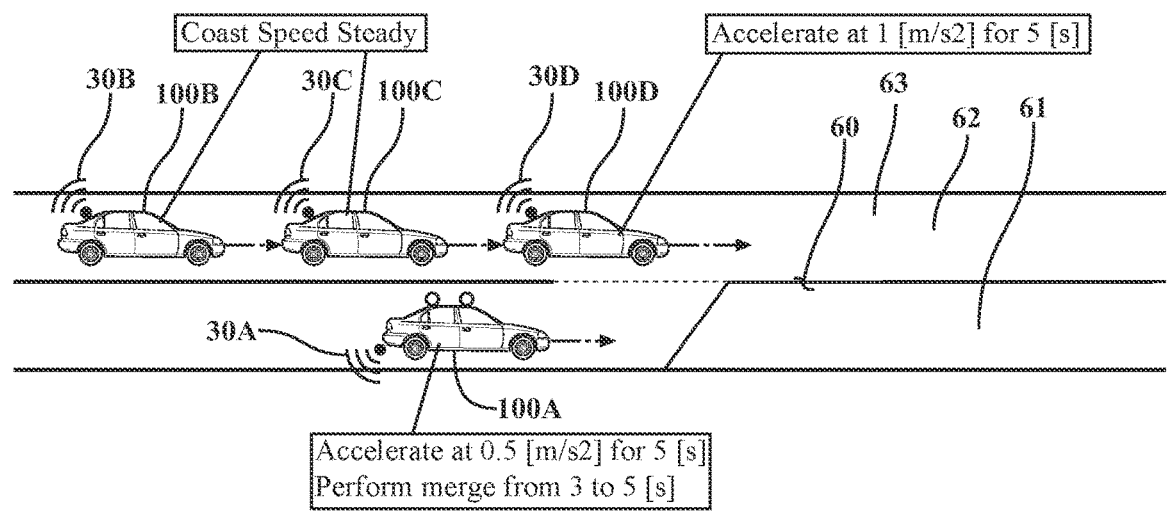

Referring to FIGS. 4A-4C, an example of how the vehicle 100A can cooperatively merge with the vehicles 100B-100D will be explained. Referring to FIG. 4A, illustrated again is the scenario where the vehicle 100A wishes to merge into the lane 62 that is to the left of the vehicle 100A. Here, the vehicle 100A, using the cooperative driving system 170A, communicates to the cloud-based server 16 via the network 14.

The cooperative driving system 170A may receive information from the cloud-based server 16 regarding the operators' driving preferences, acceleration limits, speed limits, energy consumption tolerances, etc. This information may be in the form of a digital twin framework, which provides information to mimic a particular operator's operation of a vehicle. Essentially, the cooperative driving system 170A receives and/or generates a set of parameters that allows the cooperative driving system 170A to make decisions similar to that to how the operator would make decisions if they were piloting the vehicle (in an autonomous mode) or provide directions (in a non-autonomous mode) to the operator of the vehicle 100A to operate the vehicle similarly. Additionally, the cooperative driving system 170A may provide the cloud-based server 16 data regarding past driving so driver preferences can be updated to be more accurate in the future.

In FIG. 4B, the cooperative driving systems of the vehicles 100A-100D communicate with each other using one or more communication links 30A-30D, which may be a short-range communication link, such as DSRC. Based on the digital twin framework previously provided from the cloud-based server 16, the cooperative driving system 170A of the vehicle 100A negotiates with the other vehicles 100B-100D a road-segment-level decision to allow the vehicle 100A to merge with the vehicles 100B-100D. In this case, a decision is made to merge such that the vehicle 100A merges between the vehicle 100C and the vehicle 100D.

Figure 4D:
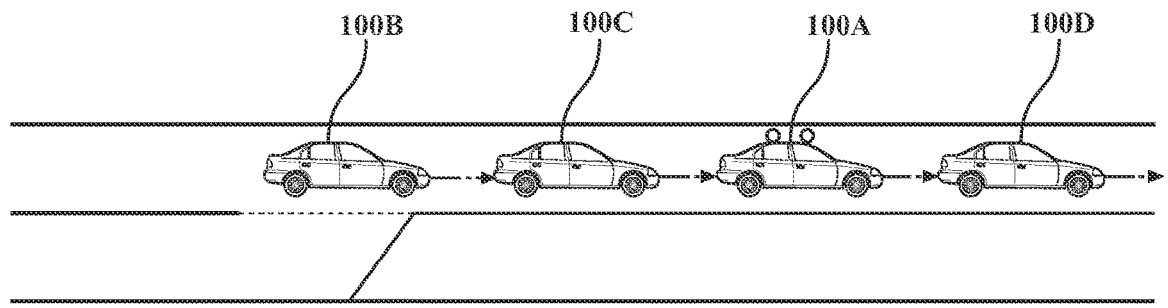

Referring to FIG. 4C, based on the decision made above and the current dynamical situation, specific actions to be performed by one or more of the vehicles 100A-100D are performed. In one example, the vehicle 100D increases acceleration for a period of time, thereby making room between the vehicles 100C and 100D. The vehicle 100A may also accelerate for period of time and then change lanes within a time window. The vehicles 100B and 100C may maintain their speed and direction. As such, as shown in FIG. 4D*m* the vehicles 100A-100D have successfully negotiated with each other over a short-time scale to allow the merging of the vehicle 100A into a lane. Decisions, such as merging order, may be made by utilizing the one or more operating parameter(s). The operating parameter(s) may stay fixed during the process of selecting a decision. Once the operating parameter(s) and the high-level decision is set, the trajectory and controls to achieve the decision are determined.

Figure 5:
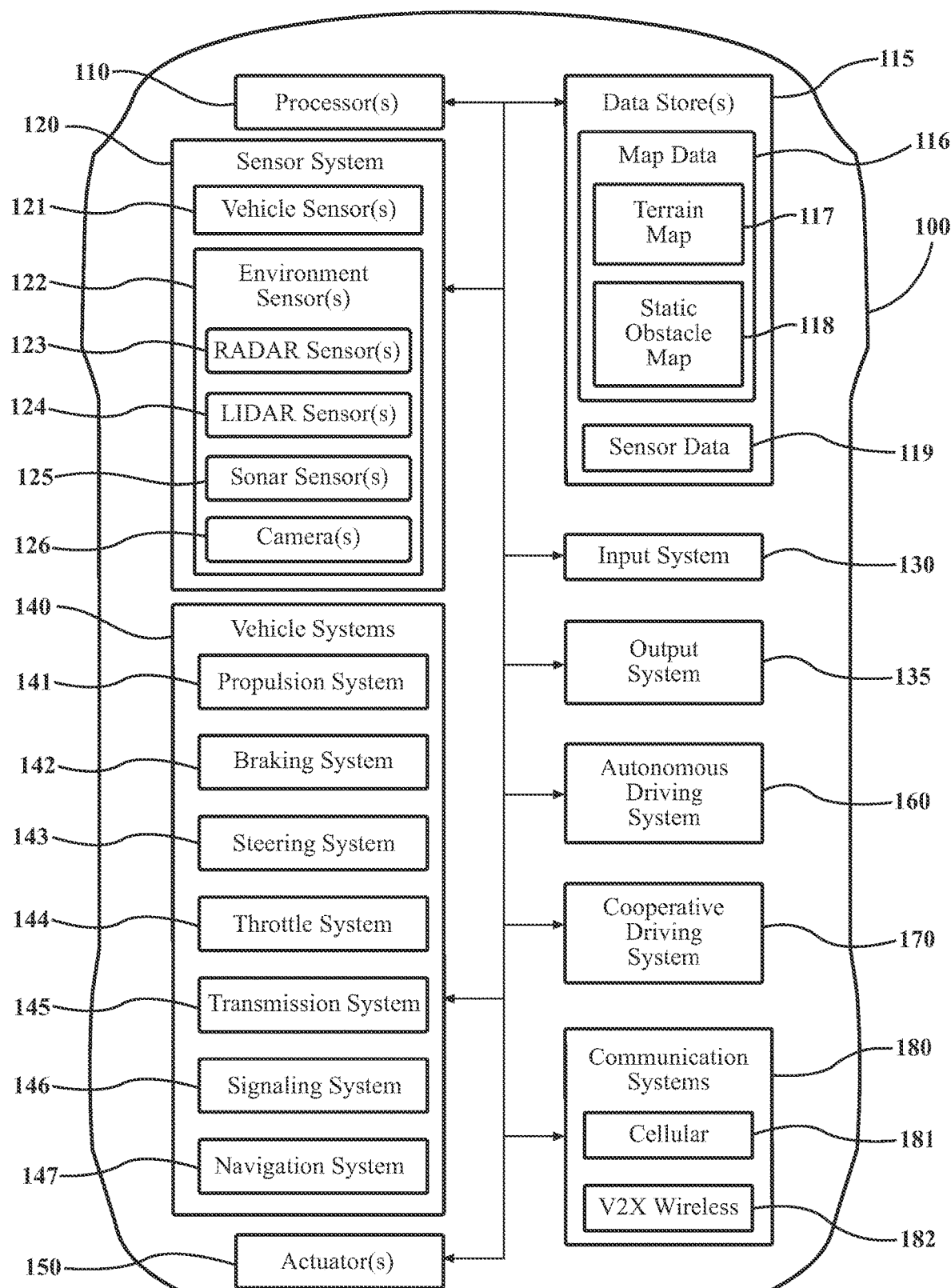
FIG. 5 illustrates a block diagram of a vehicle incorporating a cooperative driving system.

Referring to FIG. 5, an example of a vehicle 100 is illustrated that incorporates the cooperative driving system 170. The vehicle 100 may be similar to any of their vehicles, such as the vehicles 100A-100D previously described in the specification. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to the autonomous driving system 160.

The vehicle 100 also includes various elements. It will be understood that in various embodiments, it may not be necessary for the vehicle 100 to have all of the elements shown in FIG. 5. The vehicle 100 can have any combination of the various elements shown in FIG. 5. Further, the vehicle 100 can have additional elements to those shown in FIG. 5. In some arrangements, the vehicle 100 may be implemented without one or more of the elements shown in FIG. 5. While the various elements are shown as being located within the vehicle 100 in FIG. 5, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 5 and will be described along with subsequent figures. However, a description of many of the elements in FIG. 5 will be provided after discussing the figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a cooperative driving system 170. The cooperative driving system 170 may be incorporated within the autonomous driving system 160 or may be separate as shown. The cooperative driving system 170, as explained previously, includes both a long-time scale framework and a short-time scale framework. As stated before, the long-time scale framework utilizes information stored on a cloud-based server 16 that may be communicated with from the vehicle 100 having the cooperative driving system 170 by a cellular connection. In one example, the cooperative driving system 170 communicates with the cloud-based server 16 using a communication system 180 that may include hardware and appropriate software for communicating via a number of different communication methodologies. In one example, the communication system 180 may include a cellular system 181 that allows the cooperative driving system 170 to communicate with the cloud-based server 16 via a cellular network.

Additionally, as stated before, the short-time scale framework operates over a shorter timeframe and relates to negotiating maneuvers with other vehicles. In one example, the vehicle 100 may communicate with other vehicles using a V2X wireless system 182 using a short-range communication methodology. The short-range communication methodology could include DSRC but may include any suitable communication methodology. In one example, the vehicle 100 that has the cooperative driving system 170 may communicate with other vehicles via a V2X communication protocol to make road-segment-level decisions, such as merging order, intersection passing order, whether to execute a turn, etc. and provide specific directions to a human operator or vehicle controllers to perform the prescribed maneuver with a specific trajectory.

Figure 6:
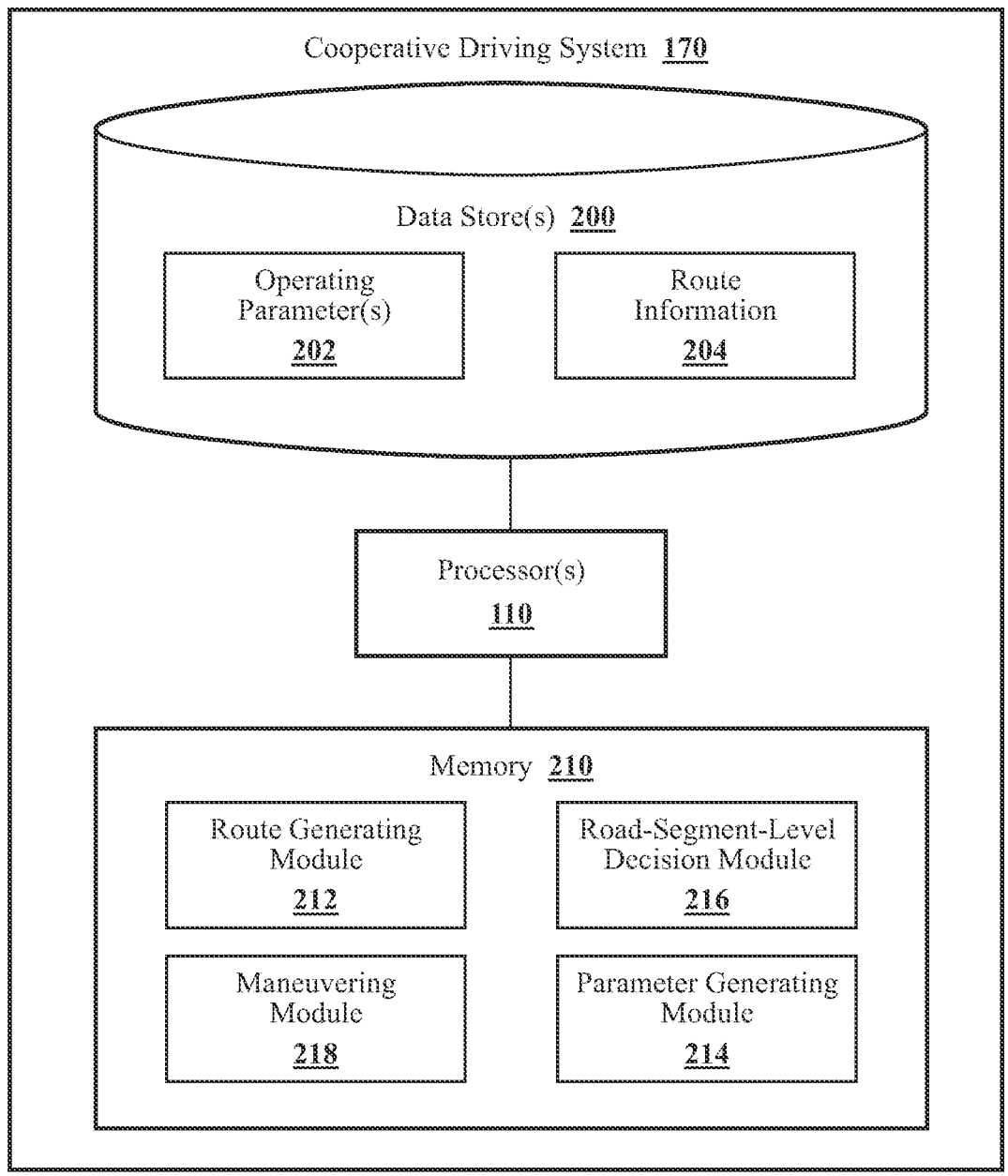
FIG. 6 illustrates a more detailed view of the cooperative driving system of FIG. 5.

With reference to FIG. 6, one embodiment of the cooperative driving system 170 is further illustrated. As shown, the cooperative driving system 170 includes one or more processor(s) 110. Accordingly, the processor(s) 110 may be a part of the cooperative driving system 170, or the cooperative driving system 170 may access the processor(s) 110 through a data bus or another communication path. In one or more embodiments, the processor(s) 110 is an application-specific integrated circuit that is configured to implement functions associated with a route generating module 212, a parameter generating module 214, a road-segment-level decision module 216, and/or a maneuvering module 218. In general, the processor(s) 110 is an electronic processor such as a microprocessor capable of performing various functions as described herein.

In one embodiment, the cooperative driving system 170 includes a memory 210 that stores the route generating module 212, the parameter generating module 214, the road-segment-level decision module 216, and/or the maneuvering module 218. The memory 210 is a random-access memory (RAM), read-only memory (ROM), a hard disk drive, a flash memory, or other suitable memory for storing the route generating module 212, the parameter generating module 214, the road-segment-level decision module 216, and/or the maneuvering module 218. The route generating module 212, the parameter generating module 214, the road-segment-level decision module 216, and/or the maneuvering module 218 are, for example, computer-readable instructions that when executed by the processor(s) 110 cause the processor(s) 110 to perform the various functions disclosed herein.

Furthermore, in one embodiment, the customizable cooperative driving system 170 includes one or more data store(s) 200. The data store(s) 200 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 200 stores data used by the modules the route generating module 212, the parameter generating module 214, the road-segment-level decision module 216, and/or the maneuvering module 218 in executing various functions. In one embodiment, the data store(s) 200 includes operating parameter(s) 202 and/or route information 204 along with, for example, other information that is used by the route generating module 212, the parameter generating module 214, the road-segment-level decision module 216, and/or the maneuvering module 218.

The operating parameter(s) 202 may be one or more operating parameters for the vehicle 100. Generally, the operating parameter(s) 202 may include information regarding a preferred operation of the vehicle 100 by an occupant of the vehicle 100. The operating parameter(s) 202 may include information such as preferred risk levels of an operator of the vehicle 100 if a particular route is utilized, acceleration profiles of the vehicle 100 that indicate an acceleration range for operating the vehicle 100 by the operator, fuel economy of the vehicle 100 or preferred target of the fuel economy of the vehicle 100 by the operator, and speed profiles of the vehicle 100 that indicate a velocity range for operating the vehicle 100.

The operating parameter(s) 202 may be generated through a question/answer session with the operator of the vehicle 100 to generate the parameters that gently mimic how the operator would operate the vehicle 100. Alternatively, the operating parameter(s) 202 may be generated by having the cooperative driving system 170 observe how the operator operates the vehicle 100 when the vehicle 100 is in a semi-autonomous or nonautonomous mode. As will be explained in greater detail later in this specification, the parameter generating module 214 can perform a number of different functions so as to develop the operating parameter(s) 202.

In one example, the operating parameter(s) 202 may be a digital twin of the occupant of the vehicle 100 that can replicate how the occupant would operate the vehicle 100. In this example, the operating parameter(s) 202 is stored within the data store(s) 200 but may have originated within the cloud-based server 16. The cloud-based server 16 may store and update the operating parameter(s) 202 in a centralized location so it can be accessed by any vehicle that the operator may utilize that has a cooperative driving system 170.

The route information 204 may be route information of a route that the vehicle 100 may utilize when traveling from an origin to a destination. In some examples, the route may be made of road segments representing a portion of the road that forms part of the route.

With regards to the modules themselves, the route generating module 212 may have instructions that, when executed by the processor(s) 110, cause the processor(s) 110 to determine a route including one or more road segments to a destination for the vehicle 100 based on (1) the operating parameter(s) 202 of the vehicle 100 and (2) a location of a like vehicle with respect to the vehicle 100 when the vehicle 100 is traveling on at least a portion of the route. The like vehicle has a like vehicle operating parameter similar to the operating parameter(s) 202 of the vehicle 100. As such, the vehicle 100 when taking the route will be located nearby other like vehicles for at least part of the route. In one example, the vehicle 100 may be within approximately 100 meters of one or more like vehicles during at least a portion of the route.

As such, referring back to FIGS. 3A-3C, in this example, the like vehicles could be the vehicles 100B-100D. The like vehicles 100B-100D may have similar operating parameters to that of the vehicle 100A. The route generating module 212 determines routes for the vehicle 100A to take to a particular destination from an origin that will allow the vehicle 100A to operate nearby other vehicles with similar operating parameters, such as the vehicles 100B-100D. By so doing, negotiating movements between the vehicles 100B-100D and 100A may be easier as they all have similar operating parameters, such as acceleration profiles, speed profiles, risk levels, and the like.

The route generating module 212 may also include instructions that cause the processor(s) 110 to determine when the operating parameter(s) 202 of the vehicle 100 is similar to the like vehicle operating parameter by comparing at least one of:

(1) risk levels of the operating parameter(s) 202 of the vehicle 100 and the like vehicle operating parameter, the risk levels indicating a collision risk if a particular route is utilized, wherein the collision risk include sat least one of time-to-collision and post-encroachment time;

(2) acceleration profiles of the operating parameter(s) 202 of the vehicle 100 and the like vehicle operating parameter, the acceleration profiles indicate an acceleration range for operating the vehicle 100 or the like vehicle;

(3) fuel economies of the operating parameter(s) 202 of the vehicle 100 and the like vehicle operating parameter; and (4) speed profiles of the operating parameter(s) 202 of the vehicle 100 and the like vehicle operating parameter, the speed profile indicates a velocity range for operating the vehicle 100 or the like vehicle.

Post encroachment time may be defined as the time difference between a vehicle leaving the area of encroachment and a conflicting vehicle entering the same area. Time-to-collision may be fined as the time required for two vehicles to collide if they continue at their present speed and on the same path.

The road-segment-level decision module 216 includes instructions that, when executed by the processor(s) 110, causes the processor(s) 110 to determine a road-segment-level decision for the vehicle 100 for the road segment based on the operating parameter(s) 202 of the vehicle 100. The road-segment-level decision includes a specific trajectory for the vehicle 100 to occupy the road segment of the route and communicate with one or more like vehicles near the road segment to negotiate the road-segment-level decision to generate a negotiated road-segment-level decision. As such, referring back to FIGS. 4A-4C, the vehicle 100A has determined a specific road segment of the route to occupy. As stated before, the vehicle 100A communicates with the vehicles 100B-100D to negotiate the road-segment-level decision to generate a negotiated road-segment-level decision.

The maneuvering module 218 includes instructions that, when executed by the processor(s) 110, cause the processor(s) 110 to maneuver the vehicle 100 inside the road segment using the negotiated road-segment-level decision described in the previous paragraph. As such, referring to FIG. 4C, specific actions to be performed by one or more of the vehicles 100A-100D are performed. In one example, the vehicle 100D increases acceleration for a period of time, thereby making room between the vehicles 100C and 100D. The vehicle 100A may also accelerate for period of time and then change lanes within a time window. The vehicles 100B and 100C may maintain their speed and direction. As such, the vehicles 100A-100D have successfully negotiated with each other over a short-time scale to allow the merging of the vehicle 100A into the road segment 63 of the lane 62.

The parameter generating module 214 includes instructions that, when executed by the processor(s) 110, cause the processor(s) 110 to generate one or more operating parameter(s) 202. In one example, the parameter generating module 214 causes the processor(s) 110 to obtain sensor information from one or more sensors that form the sensor system 120 of the vehicle 100 or from any of the vehicle systems 140. The sensor information could include information regarding average speed, average acceleration rate, and/or average brake pedal position when braking of the vehicle 100 when the operator is utilizing the vehicle 100. Based on the sensor information, the parameter generating module 214 may further cause the processor(s) 110 to generate the operating parameter(s) 202 based on this collected sensor information.

Further still, the parameter generating module 214 may include instructions that, when executed by the processor(s) 110, cause the processor(s) 110 to obtain a plurality of traveled routes by the vehicle 100. The plurality of traveled routes may be obtained by storing one or more of the routes within the route information 204. Based on the type of routes utilized, the parameter generating module 214 may cause the processor to generate an overall risk level of the routes to determine the operator's comfort with risk. The risk level generally indicates a likelihood of collision involving the vehicle 100 based on the traveled routes. For example, using this information, the operating parameter(s) can be generated that generally indicate if the operator is risk-averse at all costs, except some risks if there are benefits, such as reduced travel time or the ability to stop at a location along the route, or the operator cares little about risk and just wishes to get to the destination as quickly as possible.

The parameter generating module 214 may include instructions that, when executed by the processor(s) 110, cause the processor(s) 110 to monitor the operator's behavior further to predict what type of trips the driver will take in the future. For example, the parameter generating module 214 may cause the processor(s) 110 to access calendaring information from the operator's mobile device to determine when the operator is likely to take a trip to a certain destination. Based on this information, the parameter generating module 214 may cause the processor(s) 110 to specifically select routes that may benefit the operator, such as routes that include gas stations (if a long trip is planned in the fuel level of the vehicle 100 is low), restaurants and/or lodging.

In one example, the operating parameter(s) 202 is essentially a digital twin of the operator of the vehicle 100. Moreover, a digital twin is the generation or collection of digital data representing an operator of the vehicle. As such, the operating parameter(s) 202, being a digital twin of the operator, can determine the appropriate routes to destinations and/or operate the vehicle such that it merges or similarly interacts with other vehicles.

Figure 7:
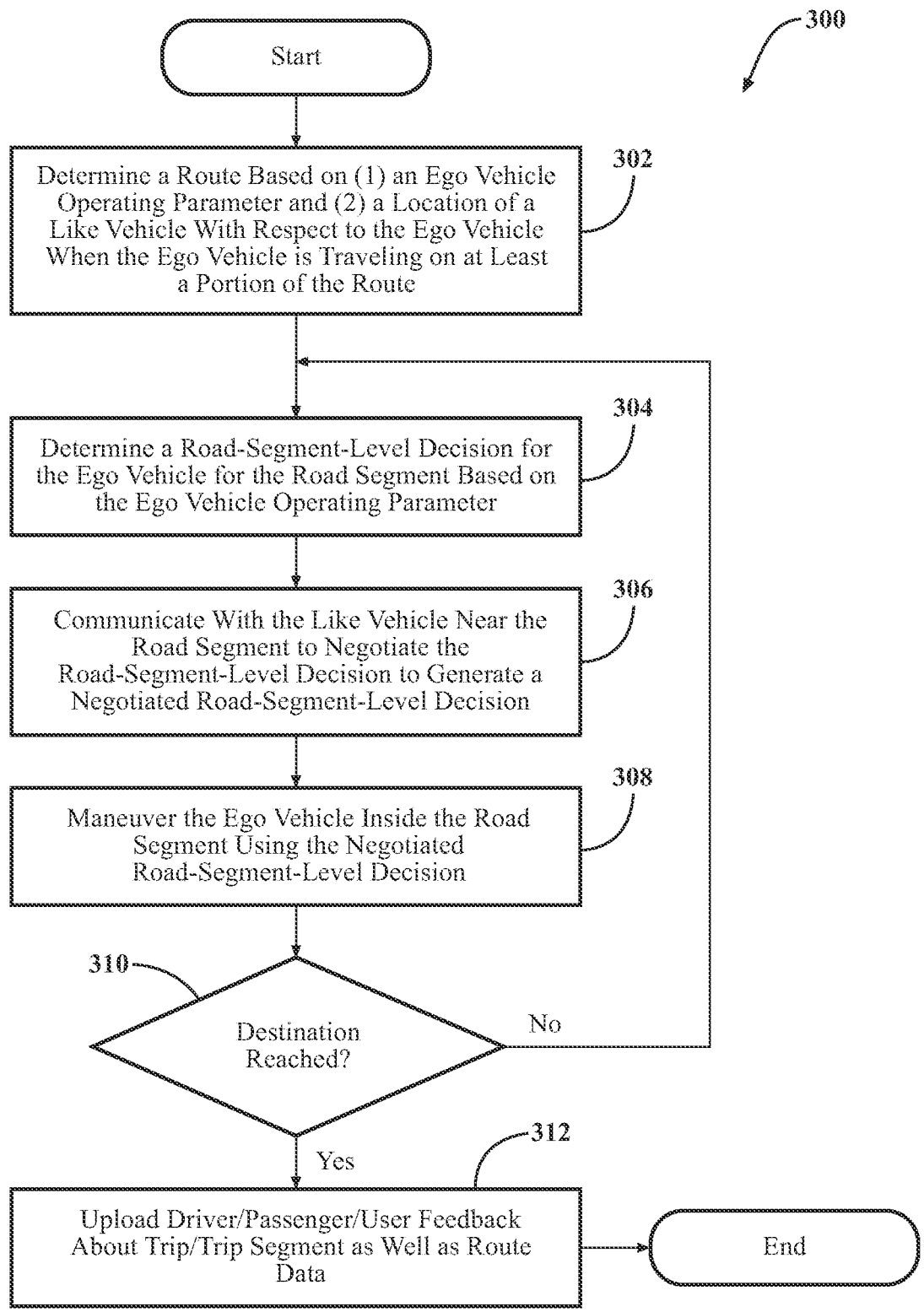
FIG. 7 illustrates a cooperative driving method.

Referring to FIG. 7, a method 300 for cooperative driving is shown. The method 300 will be described from the viewpoint of the vehicle 100 of FIG. 6 and the customize cooperative driving system 170 of FIG. 7. However, it should be understood that this is just one example of implementing the method 300. While method 300 is discussed in combination with the cooperative driving system 170, it should be appreciated that the method 300 is not limited to being implemented within the cooperative driving system 170 but is instead one example of a system that may implement the method 300.

In step 302, the route generating module 212 may have instructions that, when executed by the processor(s) 110, cause the processor(s) 110 to determine a route including a road segment to a destination for the vehicle 100 based on (1) the operating parameter(s) 202 of the vehicle 100 and (2) a location of a like vehicle with respect to the vehicle 100 when the vehicle 100 is traveling on at least a portion of the route. The like vehicle having a like vehicle operating parameter that is similar to the operating parameter(s) 202 of the vehicle 100.

In step 304, the road-segment-level decision module 216 includes instructions that, when executed by the processor(s) 110, causes the processor(s) 110 to determine a road-segment-level decision for the vehicle 100 for the road segment based on the operating parameter(s) 202 of the vehicle 100. As explained previously, the road-segment-level decision includes a specific trajectory for the vehicle 100 to occupy the road segment of the route.

In step 306, the road-segment-level decision module 216 includes instructions that, when executed by the processor(s) 110, causes the processor(s) 110 to communicate with the like vehicle near the road segment to negotiate the road-segment-level decision to generate a negotiated road-segment-level decision.

In step 308, the maneuvering module 218 includes instructions that, when executed by the processor(s) 110, cause the processor(s) 110 to maneuver the vehicle 100 inside the road segment using the negotiated road-segment-level decision. As such, referring to FIG. 4C, specific actions to be performed by one or more of the vehicles 100A-100D are performed. In one example, the vehicle 100D increases acceleration for a period of time, thereby making room between the vehicles 100C and 100D. The vehicle 100A may also accelerate for period of time and then change lanes within a time window.

In step 310, the road-segment-level decision module 216 includes instructions that, when executed by the processor(s) 110, causes the processor(s) 110 to determine if the vehicle 100 has reached its destination. If the vehicle 100 has not reached the destination, the method returns to step 304, wherein the vehicle 100 continues along the route to its destination and communicates with other vehicles to make road-segment-level decisions.

Once the vehicle 100 has reach its destination, the method 300 proceeds to step 312, wherein the processor(s) 110 may upload to the cloud-based server 16 driver, passenger, user, and/or operator feedback about the trip taken by the vehicle 100, as well as the route data utilized by the vehicle 100. As such, the cloud-based server 16 may update the operating parameter(s) 202 over time to continuously improve the digital twin of the operator so that the digital twin more accurately mimics actions taken by the operator if it was the operator that was performing the driving of the vehicle 100.

FIG. 5 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the cooperative driving system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected" or "in communication with" as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 5). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, or arrangement, or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 5. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. These systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the cooperative driving system 170, and/or the autonomous driving system 160 can be operatively connected to communicate with the vehicle systems 140 and/or individual components thereof. For example, returning to FIG. 5, the processor(s) 110 and/or the autonomous driving system 160 can be in communication to send and/or receive information from the vehicle systems 140 to control the movement, speed, maneuvering, heading, direction, etc. of the vehicle 100. The processor(s) 110, the cooperative driving system 170, and/or the autonomous driving system 160 may control some or all of these vehicle systems 140 and may be partially or fully autonomous.

The processor(s) 110, the cooperative driving system 170, and/or the autonomous driving system 160 can be operatively connected to communicate with the vehicle systems 140 and/or individual components thereof. For example, returning to FIG. 5, the processor(s) 110, the cooperative driving system 170, and/or the autonomous driving system 160 can be in communication to send and/or receive information from the vehicle systems 140 to control the movement, speed, maneuvering, heading, direction, etc. of the vehicle 100. The processor(s) 110, the cooperative driving system 170, and/or the autonomous driving system 160 may control some or all of these vehicle systems 140.

The processor(s) 110, the cooperative driving system 170, and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110, the cooperative driving system 170, and/or the autonomous driving system 160 can control the direction and/or speed of the vehicle 100. The processor(s) 110, the cooperative driving system 170, and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160, either independently or in combination with the cooperative driving system 170, can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transmission module 230.

"Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
 a processor; and
 a memory in communication with the processor, the memory having:
  a route generating module having instructions that, when executed by the processor, cause the processor to determine a route, including a road segment to a destination for an ego vehicle based on (1) an ego vehicle operating parameter that includes an ego vehicle fuel economy and (2) a location of a like vehicle with respect to the ego vehicle when the ego vehicle is traveling on at least a portion of the route, such that the ego vehicle will be located within 100 meters of the like vehicle for at least part of the route, the like vehicle having a like vehicle operating parameter that includes a like vehicle fuel economy, wherein the ego vehicle fuel economy is the same as the like vehicle fuel economy,
  a road-segment-level decision module having instructions that, when executed by the processor, cause the processor to determine a road-segment-level decision for the ego vehicle for the road segment based on the ego vehicle operating parameter, the road-segment-level decision including a specific trajectory for the ego vehicle to occupy the road segment of the route and communicate with the like vehicle near the road segment to negotiate the road-segment-level decision to generate a negotiated road-segment-level decision, and
  a vehicle maneuvering module having instructions that, when executed by the processor, cause the processor to maneuver the ego vehicle inside the road segment using the negotiated road-segment-level decision.

2. The system of claim 1, wherein the route generating module further includes instructions that, when executed by the processor, cause the processor to determine when the ego vehicle operating parameter is similar to the like vehicle operating parameter by comparing at least one of:
   risk levels of the ego vehicle operating parameter and the like vehicle operating parameter, the risk levels indicating a collision risk if a particular route is utilized; and
   a speed profile of the ego vehicle operating parameter and the like vehicle operating parameter, the speed profile indicating a velocity range for operating the ego vehicle or the like vehicle.

3. The system of claim 1, wherein the memory further includes a parameter generating module that includes instructions that, when executed by the processor, cause the processor to:
   obtain sensor information from one or more sensors of the ego vehicle including at least one of: average speed, average acceleration rate, and average brake pedal position when braking; and
   generate the ego vehicle operating parameter based on the sensor information.

4. The system of claim 1, wherein the memory further includes a parameter generating module that includes instructions that, when executed by the processor, cause the processor to:
   obtain a plurality of traveled routes by the ego vehicle;
   generate a risk level, the risk level indicating a likelihood of collision involving the ego vehicle based on the plurality of traveled routes; and
   generate the ego vehicle operating parameter based on the risk level.

5. The system of claim 1, wherein the vehicle maneuvering module further includes instructions that, when executed by the processor, cause the processor to maneuver the ego vehicle inside the road segment and near the like vehicle using the negotiated road-segment-level decision.

6. The system of claim 1, wherein the ego vehicle operating parameter includes route selection preferences based on at least one of: a risk level indicating a collision risk of the ego vehicle if the ego vehicle utilizes a particular route, a fuel economy, and a probability of encountering the like vehicle.

7. The system of claim 6, wherein the collision risk includes at least one of: a time-to-collision and a post-encroachment time.

8. The system of claim 1, wherein the ego vehicle operating parameter includes at least one of: an acceleration profile and a speed profile, wherein the acceleration profile indicates an acceleration range for accelerating the ego vehicle and the speed profile indicates a velocity range for operating the ego vehicle.

9. The system of claim 1, wherein the ego vehicle operating parameter is a digital twin of an occupant that can replicate how the occupant operates the ego vehicle.

10. A method comprising steps of:
    determining a route, including a road segment to a destination for an ego vehicle based on (1) an ego vehicle operating parameter that includes an ego vehicle fuel economy and (2) a location of a like vehicle with respect to the ego vehicle when the ego vehicle is traveling on at least a portion of the route, such that the ego vehicle will be located within 100 meters of the like vehicle for at least part of the route, the like vehicle having a like vehicle operating parameter that includes a like vehicle fuel economy, wherein the ego vehicle fuel economy is the same as the like vehicle fuel economy;
    determining a road-segment-level decision for the ego vehicle for the road segment based on the ego vehicle operating parameter, the road-segment-level decision including a specific trajectory for the ego vehicle to occupy the road segment of the route;
    communicating with the like vehicle near the road segment to negotiate the road-segment-level decision to generate a negotiated road-segment-level decision; and
    maneuvering the ego vehicle inside the road segment using the negotiated road-segment-level decision.

11. The method of claim 10, further comprising a step of determining when the ego vehicle operating parameter is similar to the like vehicle operating parameter by comparing at least one of:
    risk levels of the ego vehicle operating parameter and the like vehicle operating parameter, the risk levels indicating a collision risk if a particular route is utilized; and
    a speed profile of the ego vehicle operating parameter and the like vehicle operating parameter, the speed profile indicating a velocity range for operating the ego vehicle or the like vehicle.

12. The method of claim 10, further comprising steps of:
    obtaining sensor information from one or more sensors of the ego vehicle including at least one of: average speed, average acceleration rate, and average brake pedal position when braking; and
    generating the ego vehicle operating parameter based on the sensor information.

13. The method of claim 10, further comprising steps of:
    obtaining a plurality of traveled routes by the ego vehicle;
    generating a risk level, the risk level indicating a likelihood of collision involving the ego vehicle based on the plurality of traveled routes; and
    generating the ego vehicle operating parameter based on the risk level.

14. The method of claim 10, further comprising a step of maneuvering the ego vehicle inside the road segment and near the like vehicle using the negotiated road-segment-level decision.

15. The method of claim 10, wherein the ego vehicle operating parameter includes route selection preferences based on at least one of: a risk level indicating a collision risk of the ego vehicle if the ego vehicle utilizes a particular route, a fuel economy, and a probability of encountering the like vehicle.

16. The method of claim 15, wherein the collision risk includes at least one of: a time-to-collision and a post-encroachment time.

17. The method of claim 10, wherein the ego vehicle operating parameter includes at least one of: an acceleration profile and a speed profile, wherein the acceleration profile indicates an acceleration range for accelerating the ego vehicle and the speed profile indicates a velocity range for operating the ego vehicle.

18. The method of claim 10, wherein the ego vehicle operating parameter is a digital twin of an occupant that can replicate how the occupant operates the ego vehicle.

19. A non-transitory computer-readable medium including instructions that, when executed by a processor, cause the processor to:
    determine a route, including a road segment to a destination for an ego vehicle based on (1) an ego vehicle operating parameter that includes an ego vehicle fuel economy, and (2) a location of a like vehicle with respect to the ego vehicle when the ego vehicle is traveling on at least a portion of the route, such that the ego vehicle will be located within 100 meters of the like vehicle for at least part of the route, the like vehicle having a like vehicle operating parameter that includes a like vehicle fuel economy, wherein the ego vehicle fuel economy is the same as the like vehicle fuel economy;

determine a road-segment-level decision for the ego vehicle for the road segment based on the ego vehicle operating parameter, the road-segment-level decision including a specific trajectory for the ego vehicle to occupy the road segment of the route;

communicate with the like vehicle near the road segment to negotiate the road-segment-level decision to generate a negotiated road-segment-level decision; and maneuver the ego vehicle inside the road segment using the negotiated road-segment-level decision.

20. The non-transitory computer-readable medium of claim 19, further including instructions that, when executed by the processor, cause the processor to determine when the ego vehicle operating parameter is similar to the like vehicle operating parameter by comparing at least one of:

risk levels of the ego vehicle operating parameter and the like vehicle operating parameter, the risk levels indicating a collision risk if a particular route is utilized; and a speed profile of the ego vehicle operating parameter and the like vehicle operating parameter, the speed profile indicating a velocity range for operating the ego vehicle or the like vehicle.

\* \* \* \* \*